(12) United States Patent
Levy

(10) Patent No.: US 12,505,270 B1
(45) Date of Patent: Dec. 23, 2025

(54) SYSTEM AND METHOD FOR INTEGRATED CIRCUIT DESIGN

(71) Applicant: Silimate, Inc., Mountain View, CA (US)

(72) Inventor: Akash Levy, Mountain View, CA (US)

(73) Assignee: Silimate, Inc., Mountain View, CA (US)

( * ) Notice: Subject to any disclaimer, the term of this patent is extended or adjusted under 35 U.S.C. 154(b) by 0 days.

(21) Appl. No.: 19/238,876

(22) Filed: Jun. 16, 2025

Related U.S. Application Data

(60) Provisional application No. 63/662,656, filed on Jun. 21, 2024.

(51) Int. Cl.
*G06F 30/327* (2020.01)
*G06N 20/00* (2019.01)

(52) U.S. Cl.
CPC .......... *G06F 30/327* (2020.01); *G06N 20/00* (2019.01)

(58) Field of Classification Search
USPC ........................................................ 716/103
See application file for complete search history.

(56) References Cited

U.S. PATENT DOCUMENTS

| 10,970,441 | B1 * | 4/2021 | Zhang ................... G06N 3/063 |
| 2024/0169135 | A1 | 5/2024 | Walston et al. |

FOREIGN PATENT DOCUMENTS

| CN | 118036423 A * | 5/2024 | ......... G01R 31/2855 |

OTHER PUBLICATIONS

Levy, et al., "FastPASE: An AI-Driven Fast PPA Speculation Engine for RTL Design Space Optimization", 2024 25th International Symposium on Quality Electronic Design (ISQED), Apr. 3-5, 2024, San Francisco, CA, USA, 10.1109/ISQED60706.2024.10528750.

* cited by examiner

*Primary Examiner* — Mohammed Alam
(74) *Attorney, Agent, or Firm* — Jeffrey Schox; Samuel Rosenthal

(57) ABSTRACT

A method for integrated circuit design, preferably including: determining a model, determining an input, and/or providing predictions. A system for integrated circuit design, preferably including: a training module, an input module, a prediction module, an operator model, a scaling model, and/or one or more computing systems. In some variants, the system and/or method can function to provide rapid predictions of integrated circuit metrics, such as power, performance, area, and/or the like, associated with one or more integrated circuit designs.

20 Claims, 4 Drawing Sheets

SYSTEM AND METHOD FOR INTEGRATED CIRCUIT DESIGN

CROSS-REFERENCE TO RELATED APPLICATIONS

This application claims the benefit of U.S. Provisional Application No. 63/662,656, filed 21 Jun. 2024, which is herein incorporated in its entirety by this reference.

TECHNICAL FIELD

This invention relates generally to the integrated circuit design field, and more specifically to a new and useful system and method for integrated circuit design.

DETAILED DESCRIPTION OF THE INVENTION

The following description of the preferred embodiments of the invention is not intended to limit the invention to these preferred embodiments, but rather to enable any person skilled in the art to make and use this invention.

1. Overview

A system 10 and method 20 for integrated circuit (IC) design preferably function to facilitate integrated circuit design, such as by providing rapid predictions of integrated circuit metrics (e.g., power, performance, area, etc.) associated with integrated circuit designs.

Figure 1:
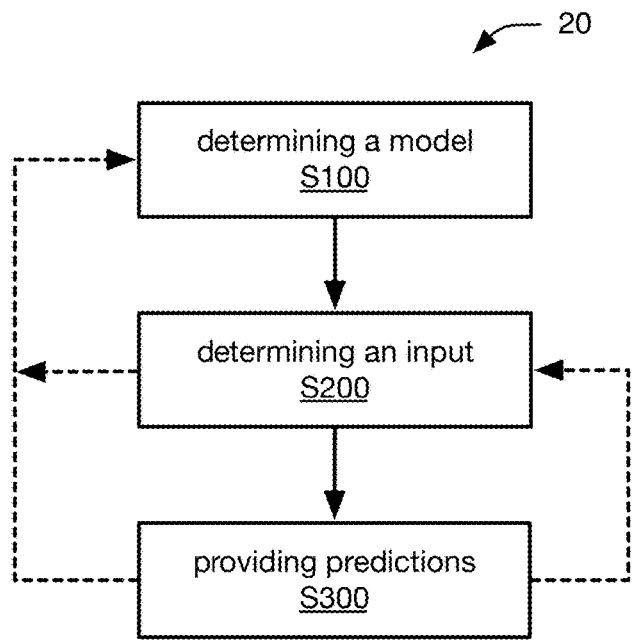
FIG. 1 is a schematic representation of an embodiment of a method for integrated circuit design.
Figure 4:
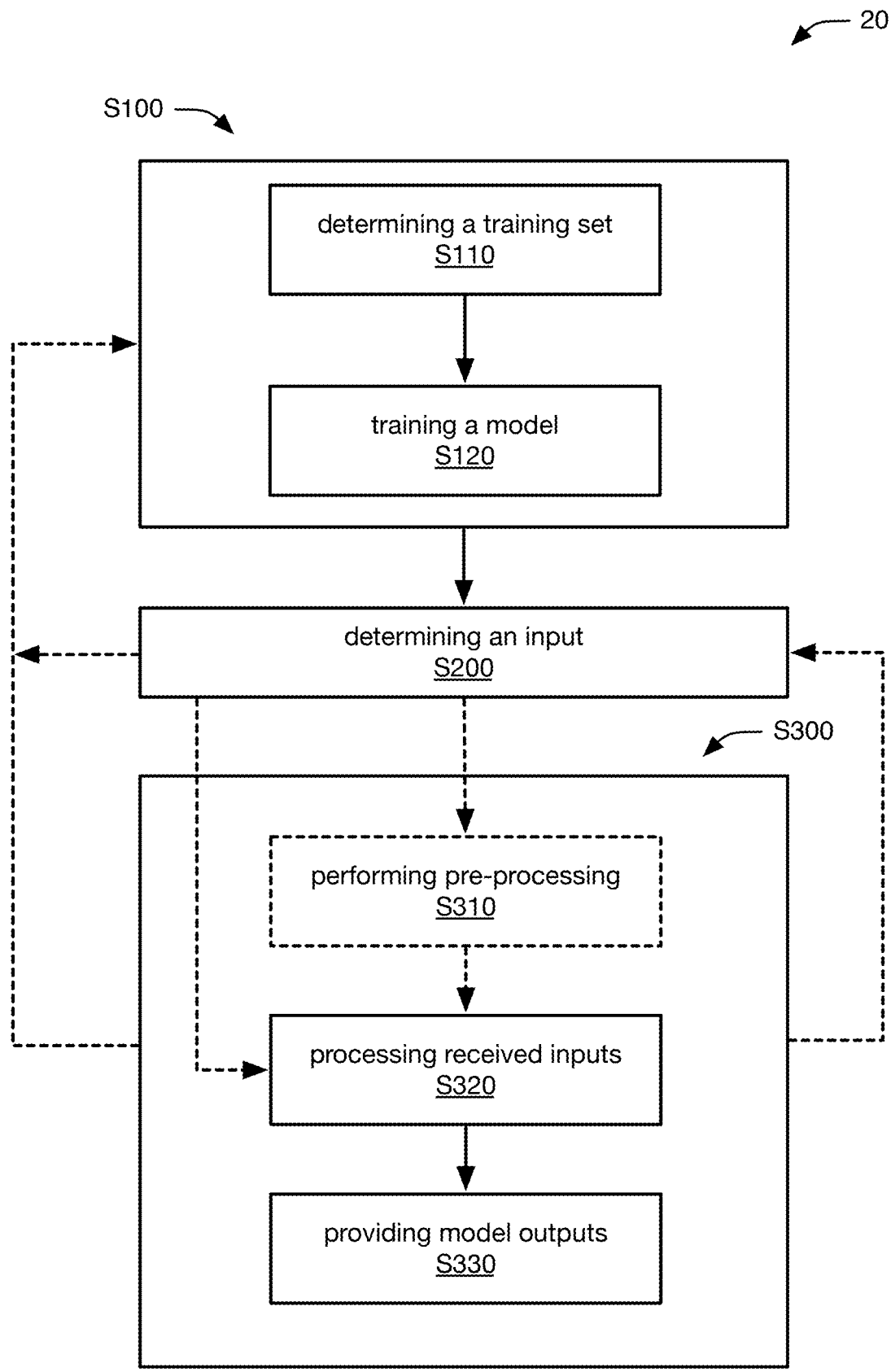
FIG. 4 is a schematic representation of an example of the method.

The method for IC design preferably includes determining a model S100, determining an input S200, and/or providing predictions S300 (e.g., as shown by way of examples in FIG. 1 and/or FIG. 4). However, the method can additionally or alternatively include any other suitable elements performed in any suitable manner.

Figure 5:
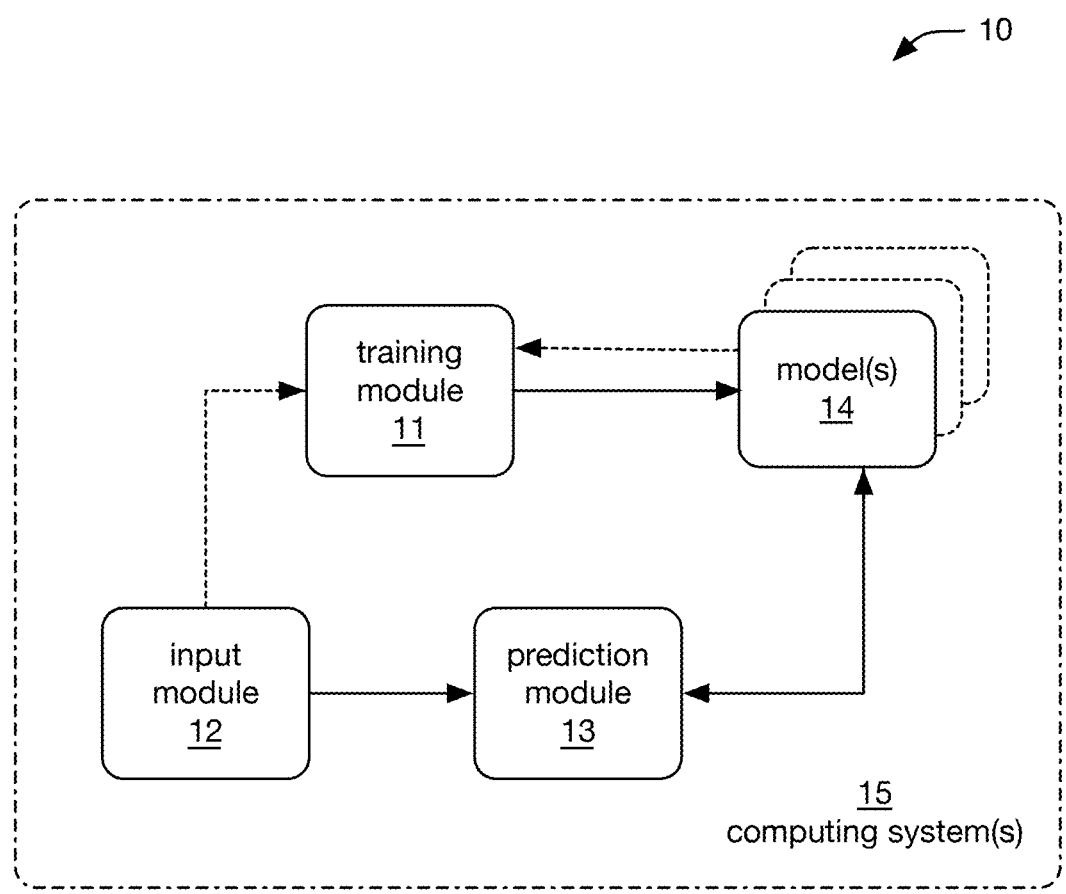
FIG. 5 is a schematic representation of an embodiment of a system for integrated circuit design.

The system for IC design preferably includes a training module, an input module, a prediction module, one or more models (e.g., trained models), and/or one or more computing systems (e.g., implementing the one or more models and/or modules), such as shown by way of example in FIG. 5. However, the system can additionally or alternatively include any other suitable elements having any suitable configurations and/or functionalities.

The method is preferably performed using the system, but can additionally or alternatively be performed using any other suitable system(s). The system is preferably configured to perform the method, but can additionally or alternatively perform any other suitable method(s).

2. Technical Advantages

Variants of the technology can confer one or more advantages over conventional technologies.

Some variants of the technology can provide rapid (e.g., within minutes, seconds, or sub-second timeframes) predictions of IC design metrics (e.g., metrics associated with power, timing/performance, area, device counts, etc.). For example, this can be achieved by the use of statistical models (e.g., machine learning models such as neural networks, random forests, etc.; parameterized regression models; etc.) that can predict such metrics based on input information such as IC design specifications. In contrast, such metrics are typically determined by using IC synthesis tools to completely model an integrated circuit (e.g., determine the layout of the IC conductors, gates, etc.); however, these synthesis tools typically require hours to days of computation to perform such synthesis for each design specification, and may also be expensive to obtain and/or of limited availability (e.g., due to a limited number of seats available under a synthesis tool software license). Accordingly, such variants of the technology can enable rapid iterative design of integrated circuits, such as wherein IC designers can rapidly receive metric predictions for an IC design, make one or more modifications to the IC design (e.g., based in part or in whole on the metric predictions), rapidly receive metric predictions the modified design, and optionally continue to iteratively modify (e.g., improve) the design based on the predictions (e.g., wherein such predictions can provide rapid feedback which portions of a design may require and/or benefit from modification, on whether design modifications have had the desired and/or intended effect, etc.).

Additionally or alternatively, some variants of the technology can determine and/or provide metrics at an operator-specific level (e.g., rather than at a gate-specific level, such as in typical synthesis-based approaches), which can thereby establish a direct (e.g., one-to-one) correspondence between operators in the IC design specification and predicted metrics determined using the technology. Accordingly, this can enable precise and/or facile identification of deleterious design features (e.g., bottlenecks such as timing bottlenecks, operators with outsized power and/or area requirements, etc.) within the original IC specification. Unlike typical approaches, in which performance issues are reported at the synthesized gate-level, which often obscures the relationship to the original design code, the operator-level granularity offered by variants of the technology can maintain clear traceability back to specific operations, functions, and/or constructs in the design specification. Consequently, such variants of the technology can facilitate identification of problematic sections in IC specification that contribute to suboptimal power consumption, timing violations, excessive area usage, and/or other design constraints. This direct mapping can significantly reduce the cognitive burden on designers who would otherwise need to mentally translate low-level gate information back to their high-level design constructs, and can thereby streamline the designers' IC specification optimization process and/or reduce the expertise required to perform such optimizations.

Accordingly, in variants in which the technology enables rapid predictions and/or operator-specific metrics, either of these advantages (and/or, in variants in which both advantages are conferred, the combination of these two advantages) can allow designers to focus their efforts on the most impactful modifications, which can substantially accelerate the overall design optimization cycle. Additionally or alternatively, some such variants can facilitate earlier detection of design issues in the development cycle, when modifications are less costly and disruptive. By providing accurate performance predictions before committing to full synthesis, some such variants can enable users to validate design decisions and identify potential issues at the specification stage, rather than deferring these tasks to post-synthesis verification. This earlier feedback can substantially reduce development costs by minimizing expensive design iterations that would otherwise occur later in the process. Additionally or alternatively, some such variants of the technology can enable more effective collaboration between design teams by providing a common, objective basis for evaluating design alternatives and communicating design intent, thereby improving overall engineering productivity.

However, further advantages can additionally or alternatively be conferred by variants of the system and/or method disclosed herein.

3. Method 3.1 Determining a Model.

Figure 2A:
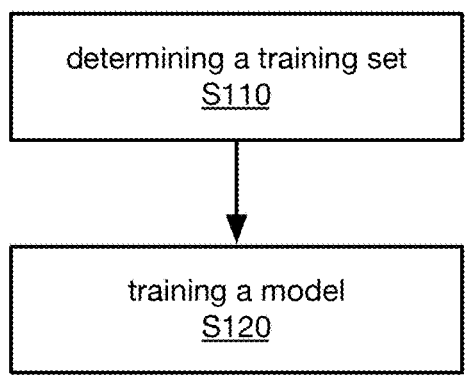
FIG. 2A is a schematic representation of an embodiment of determining a model according to the method.

Determining a model S100 preferably functions to provide one or more models for integrated circuit design predictions, which can, in examples, include predictions related to metrics such as power (e.g., static power requirements, dynamic power requirements under one or more running conditions such as based on one or more sets of input waveforms, etc.), performance (e.g., setup timing, hold timing, clock domain crossings, etc.), area, gate count, wire count, and the like. Determining a model can include generating a model, updating a model (e.g., updating a previously-generated model, such as a model generated in a previous performance of S100, which can include fine-tuning the model and/or updating the model in any other suitable manner), receiving a model, and/or determining a model in any other suitable manner. Determining the model can include determining a training set S110 and/or training the model S120 (e.g., as shown in FIGS. 2A and/or 4). However, determining the model can additionally or alternatively include any other suitable elements performed in any suitable manner.

A person of skill in the art will recognize that the model determined in S100 can include any suitable number of sub-models, each of which may be referred to herein as a model. Further, a person of skill in the art will recognize that each such sub-model (or any suitable subset thereof) can be determined using any or all of the approaches described herein (and/or using any other suitable approach(es)). For example, S100 can include determining a primary model (e.g., that functions to determine one or more IC metrics, such as power, performance, area, gate count, wire count, etc., based on an IC design specification), determining a scaling model (e.g., that functions to scale one or more of IC metrics, such as one or more IC metrics determined by the primary model), and/or determining any other suitable model(s); in a specific example, the model determined in S100 includes a primary model and a scaling model chained to the primary model, such that the output of the primary model is used as an input to the scaling model. However, the model can additionally or alternatively include any other suitable sub-models and/or be configured in any other suitable manner.

Determining a training set S110 can include generating a training set (e.g., generating synthetic training data, selecting training data such as synthetic and/or 'real-world' training data, etc.), receiving a training set, updating a training set (e.g., updating a pre-existing training set, such as a training set determined in a previous performance of S110 or a training set received during performance of S110, wherein updating the training set can include adding examples to the training set, removing examples from the training set, altering examples in the training set such as by updating labels of the examples, and/or updating the training set in any other suitable manner), and/or determining the training set in any other suitable manner.

The training set preferably includes a set of labeled inputs (e.g., wherein the labels correspond to the desired outputs of the model when provided with the corresponding input). Determining the training set preferably functions to determine a set of data that can enable generation of the desired model.

Each input preferably includes, is representative of, and/or includes information associated with an integrated circuit design specification, and can optionally include timing constraints, black box element specifications, activity factor information (e.g., information associated with activity factors for each operator of the design specification, for each of one or more specified running conditions at the integrated circuit, which can be a separate activity factor for each input conductor of an operator, an average activity factor for multiple input conductors of an operator such as for all input conductors of the operator, and/or any other suitable information associated with activity factors for the operator, such as described below in more detail regarding S310), and/or any other suitable elements. In a first example, the design specification is specified using high-level synthesis (HLS) methodologies (e.g., from one or more languages such as SystemC, C, C++, Python, etc.). In a second example, the design specification is specified in a hardware description language (HDL) and/or hardware description/verification language (HDVL), such as VHDL, Verilog, SystemVerilog, and the like. In a third example, the design specification is specified as a netlist (e.g., gate-level netlist, elaborated netlist, etc.). However, the IC design specification can be provided in any other suitable format. The timing constraints preferably specify timing-based design constraints (and/or any other suitable constraints) associated with the design. The timing constraints can be provided as Synopsys Design Constraints (SDC) and/or in any other suitable format. The black box element specifications can include one or more metrics and/or other information (e.g., power, area, timing arcs, activity factors and/or information associated therewith, etc.) for one or more black box elements (e.g., predefined IC elements, such as existing IP blocks).

The IC design specification preferably specifies an operator type for each operator. In examples, the operator types can include: arithmetic operators (e.g., add, multiply, subtract, divide, modulo, square, cube, square root, reciprocal, power, multiply-accumulate (MAC), etc.), logical operators (e.g., AND, NAND, OR, NOR, XOR, XNOR, NOT, buffer, etc.; bitwise operators such as shift, rotate, bit set, bit clear, bit toggle, bit field extract, bit field insert, population count, leading zero count, trailing zero count, etc.), comparison operators (e.g., equal, not equal, greater than, less than, not greater than, not less than, etc.), special function operators (e.g., trigonometric functions such as sin, cos, tan, etc.; absolute value, min, max, clamp, saturate, logarithm, exponential, etc.), control operators (e.g., MUX, DEMUX, priority encoder, priority decoder, arbitration, etc.), and/or any other suitable operator types.

In some embodiments, each input includes information associated with only a single operator of the IC design specification. For example, the input preferably includes the operator type and input characteristics (e.g., bit width, constant vs. variable, format such as signed vs. unsigned, driving impedance, etc.) for each input value (e.g., for a binary operator, providing bit width and constancy information for each of the two inputs, optionally along with a single indication of whether the operator expects signed or unsigned values; for a unary operator, providing a bit width and optionally an indication of whether the operator expects a signed or unsigned value; etc.), and can optionally include one or more output characteristics (e.g., bit width, format, driven impedance, fan-out, etc.) for each output value (e.g., for an operator providing a single output value, providing bit width, and optionally an indication of whether the output is signed or unsigned, such as if this is not specified for the inputs or generally for the operator and is not implicit from the operator type), activity factors (which may also be referred to as switching activity) and/or associated information (e.g., as described below in more detail), and/or any other suitable information.

However, each input can additionally or alternatively include any other suitable information.

Each input in the training set is preferably associated with a corresponding label. For example, the label for an input can include, for each element of the design specification (e.g., each operator present in the design specification): the corresponding static power, area, timing arcs, number of gates, number of wires, dynamic power for one or more running conditions (e.g., for a particular set of input waveforms to the IC network; for a particular set of activity factors at the input conductors of the element; for information associated with such activity factors, such as an average activity factor for the input conductors of the element; etc.), and/or any other suitable information associated with the synthesized IC network that corresponds to that element (e.g., that operator). In embodiments in which each input includes information associated with only a single operator, the label preferably includes such information for the single operator. However, the labels can additionally or alternatively include any other suitable information.

The training set can include synthetic inputs and/or 'real-world' inputs.

In one embodiment, each synthetic input (or any suitable subset of the synthetic inputs) corresponds to a single operator (e.g., add; subtract; multiply; divide; power; modulus; negation; logical operators such as logical AND, logical OR, logical NOT, etc.; relational operators such as greater than, less than, greater than or equal to, less than or equal to, etc.; equality; inequality; bitwise operators such as bitwise negation, bitwise AND, bitwise OR, bitwise XOR, bitwise XNOR, etc.; right shift; left shift; conditional operators; etc.). Such single-operator inputs are referred to herein as "simple inputs" and/or "operator-level inputs".

For example, the training set can include various configurations of each operator available for use in the design specification. For each such operator, the various configurations can include changing the operator bit width, the driving impedance provided at the operator input, the operator output fan-out, the driven impedances of the one or more downstream networks driven by the operator output, input value format (e.g., signed vs. unsigned), input value constancy (e.g., all variable input values vs. one or more constant input values), and/or any other suitable parameters. In a first example, the selection-based configuration parameters (e.g., input value format and constancy) can describe, for a binary operator (e.g., add, multiply, etc.): whether both input values are variable or alternatively if one of the input values is constant, and can describe whether each input value is signed or unsigned (e.g., both values signed, both values unsigned, only the first value signed, or only the second value signed). In some examples, the same set of configurations can be used for each operator (or for each operator of the same arity, such as a first set of configurations for all unary operators, a second set of configurations for all binary operators, a third set of configurations for all ternary operators, etc.), whereas in other examples, different operators (e.g., of the same arity) may be employed with different configurations and/or with differing numbers of configurations from each other.

In a specific example, the various configurations can include powers of two for some or all of the numerical configuration parameters (e.g., bit width, driving impedance, fan-out, driven impedances, etc.), such as wherein the synthetic data defines a (sparse or dense) matrix in which the values of each numerical configuration parameter (or of any suitable subset of such numerical configuration parameters) is swept by powers of two (e.g., bit widths of 2, 4, 8, 16, 32, and 64 bits; fan-outs of 1, 2, 4, 8, 16, and 32; etc.), and/or can include all possible values (or any suitable subset of such values) for selection-based configuration parameters (e.g., input value format such as signed vs. unsigned, input value constancy such as specifying which input values may vary, etc.). However, the synthetic inputs can additionally or alternatively include any other suitable inputs.

The real-world inputs are preferably derived from one or more actual integrated circuit designs. These IC designs can include open-source designs, proprietary designs, and/or any other suitable designs. The real-world inputs can include entire IC designs and/or subsets thereof (e.g., wherein one or more networks within a design can be selected as different real-world inputs).

The training set can include generic inputs and/or specific inputs (e.g., wherein the specific inputs are specific to a particular IC technology and/or synthesis tool).

The generic inputs are preferably labeled by synthesizing each input using a standard synthesis tool (e.g., wherein the desired data for the labels can be extracted and/or derived from the resulting synthesis), such as an open-source synthesis tool.

The specific inputs are preferably labeled by synthesizing each input using a proprietary synthesis tool (e.g., corresponding to the desired IC technology and/or synthesis tool). In a first example of labeling specific inputs, a user can run synthesis on a template design specification and provide the corresponding gate-level representations and/or the metrics derived therefrom (e.g., wherein the synthesis is performed using the desired synthesis tool and/or specifying the desired IC technology). In a second example, a user can provide examples of real-world designs (e.g., as design specifications), along with the corresponding gate-level representations and/or metrics derived therefrom (e.g., wherein the gate-level representations were synthesized using the desired synthesis tool and/or specifying the desired IC technology).

However, the training data can additionally or alternatively be labeled in any other suitable manner.

In one example, generating synthetic inputs can include, for each operator available for use in the design specification (e.g., for each Verilog operator, or for each synthesizable Verilog operator): selecting a variety of configurations for the operator, synthesizing each configuration, and determining labels. Each operator can be configured with one or more different bit widths and/or topologies (e.g., driving impedances, fan-outs, driven impedances, etc.). The number and/or type of different configurations may vary between the different operators. For example, bit width is typically irrelevant (or mostly irrelevant) to OR gate structure, and so it may be desirable to use only a single bit width for OR gate configurations (or alternatively, only a few different bit widths); in contrast, bit width has significant implications for the structure of an adder, and so it may be preferable to use many different bit width configurations for an addition operator. In one example, for each operator (e.g., of approximately 50 different synthesizable operators), an average of 20-50 different configurations can be selected (e.g., for a total of approximately 1,000-2,500 different synthetic inputs). Synthesizing each configuration (e.g., using an open-source synthesis tool) preferably functions to generate a gate-level representation (e.g., gate list). Determining labels (e.g., power, area, timing arcs, number of gates, number of wires, etc.) is preferably performed based on the resulting gate list.

However, the training set can additionally or alternatively be generated in any other suitable manner.

Training the model S120 is preferably performed using the training set generated such as described above. The model can have any suitable architecture (and/or can be an ensemble of multiple such architectures). In examples, the model can include one or more: non-parametric models, such as random forests (e.g., which can have very high confidence for examples that are very close to one or more training examples), neural networks, data-driven models such as interpolation meshes and/or other interpolation models, etc.; parametric models (e.g., linear, power, polynomial, and/or exponential regression models, etc.); and/or any other suitable architectures and/or ensembles thereof.

In some embodiments, each input includes information associated with only a single operator of the IC design specification (e.g., wherein the model, or any suitable sub-model(s) of the model, produces predictions for only a single operator at a time).

In some such embodiments, the model is (or includes) one or more interpolation models. The interpolation model is preferably a data-driven model such as an interpolation mesh (e.g., linear interpolation mesh) or nearest neighbor(s) model, but can additionally or alternatively include any other suitable interpolation model(s) (e.g., linear interpolation, cubic interpolation, Lagrange polynomials, Newton polynomials, Hermite interpolation, linear splines, cubic splines, B-splines, natural splines, tension splines, Gaussian RBF, multiquadric RBF, thin-plate splines, polyharmonic splines, triangulation methods, inverse distance weighting, Kriging, Gaussian process regression, Shepard's method, bilinear interpolation, trilinear interpolation, barycentric interpolation, Hermite cubic interpolation, NURBS, sinc interpolation, etc.).

Additionally or alternatively, in some such embodiments, the model is (or includes) one or more parametric models. The parametric model is preferably a statistical regression model that fits data to one or more predefined functional forms (e.g., linear, power-law, polynomial, exponential, etc.). In some examples, determining the model can include determining (e.g., for each input parameter, for each operator type, etc.), the appropriate functional form(s) to use, such as predetermining based on the type of data (e.g., operator type, such as wherein a particular functional relationship is known to perform best for a particular operator type with a particular synthesis tool) and/or manually or dynamically determining (e.g., based on which functional form provides the best fit). For example, selecting a parametric form can include evaluating (e.g., based on fit criteria, validation metrics, etc.) candidate parametric forms (e.g., linear, power-law, exponential, polynomial, etc.), such as estimating fitting parameter values for each candidate form (or any suitable subset of such forms) and selecting the form that allows for the best fit. However, the parametric form can additionally or alternatively be determined in any other suitable manner.

In one such embodiment, the model (e.g., the primary model) includes an interpolation sub-model and an extrapolation sub-model; such a model is referred to herein as a "hybrid model". In this embodiment, the interpolation sub-model is preferably employed for input values that fall within the range of the training data, whereas the extrapolation sub-model is preferably employed for input values that fall outside the range of the training data. The interpolation sub-model preferably includes one or more interpolation models such as described above (e.g., interpolation mesh such as a linear interpolation mesh), but can additionally or alternatively include any other suitable model(s). The extrapolation sub-model preferably includes one or more parametric models such as described above (e.g., with a dynamically-determined functional form), but can additionally or alternatively include non-parametric models (e.g., machine learning models such as random forests and/or neural networks) and/or any other suitable model(s). In this embodiment, if an input includes a first value for a first parameter that falls within the training data range and includes a second value for a second parameter that falls outside the training data range, then the model can use only the extrapolation model, use only the interpolation model, or use a combination of the models; for example, using a combination of the models can include: for the first parameter, selecting one or more values from the training data (e.g., nearest neighbor values) for that parameter (e.g., one training data value on either side of the first value); for each selected value, performing a separate extrapolation for the second parameter using the extrapolation model; and performing an interpolation along the first parameter based on the extrapolated values.

Figure 3A:
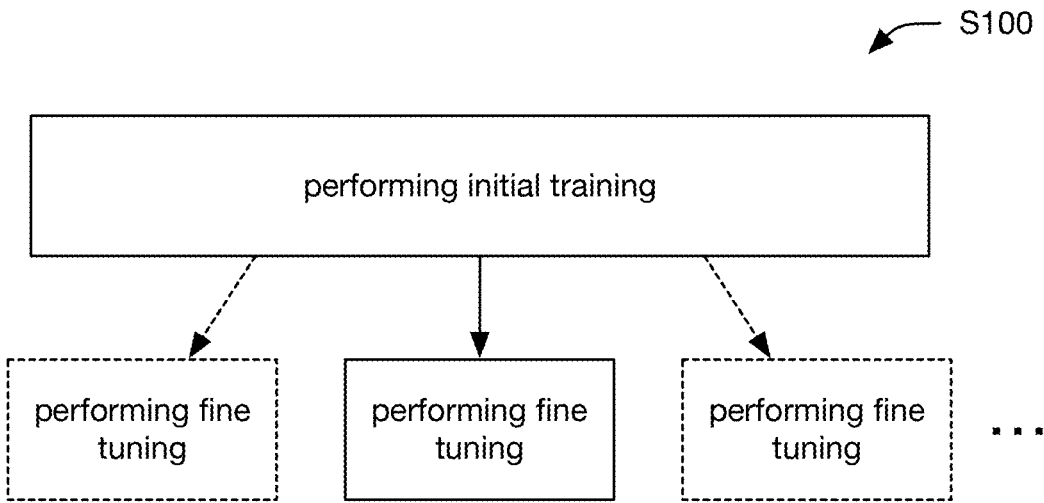
FIG. 3A is a schematic representation of a variation of determining one or more models according to the method.

In some examples, training the model can include performing initial training and performing fine tuning (e.g., as shown in FIG. 3A). For example, the initial training can be performed using a first training set that includes only generic inputs, and subsequent fine tuning of this model can be performed using a second training set that includes specific inputs (e.g., for a specific IC technology and/or synthesis tool) to generate a specialized model, such as shown by way of example in FIG. 3B. Additionally or alternatively, the initial training can be performed using a first training set that includes only simple inputs (e.g., each including only a single operator, preferably with high parameter space coverage, such as wherein the inputs are synthesized to achieve such coverage), such as simple generic inputs and/or simple specific inputs, and subsequent fine tuning of this model can be performed using a second training set that includes more complex inputs (e.g., inputs including multiple interconnected operators, such as inputs representing entire IC designs or any suitable subsets thereof; typically 'real-world' inputs, but additionally or alternatively can include synthetic inputs), preferably complex specific inputs that correspond to a specific IC technology and/or synthesis tool, but additionally or alternatively complex generic inputs and/or any other suitable inputs. Such inputs including information based on IC designs with a plurality of operators can be referred to herein as "complex inputs" and/or "IC-level inputs".

Figure 3B:
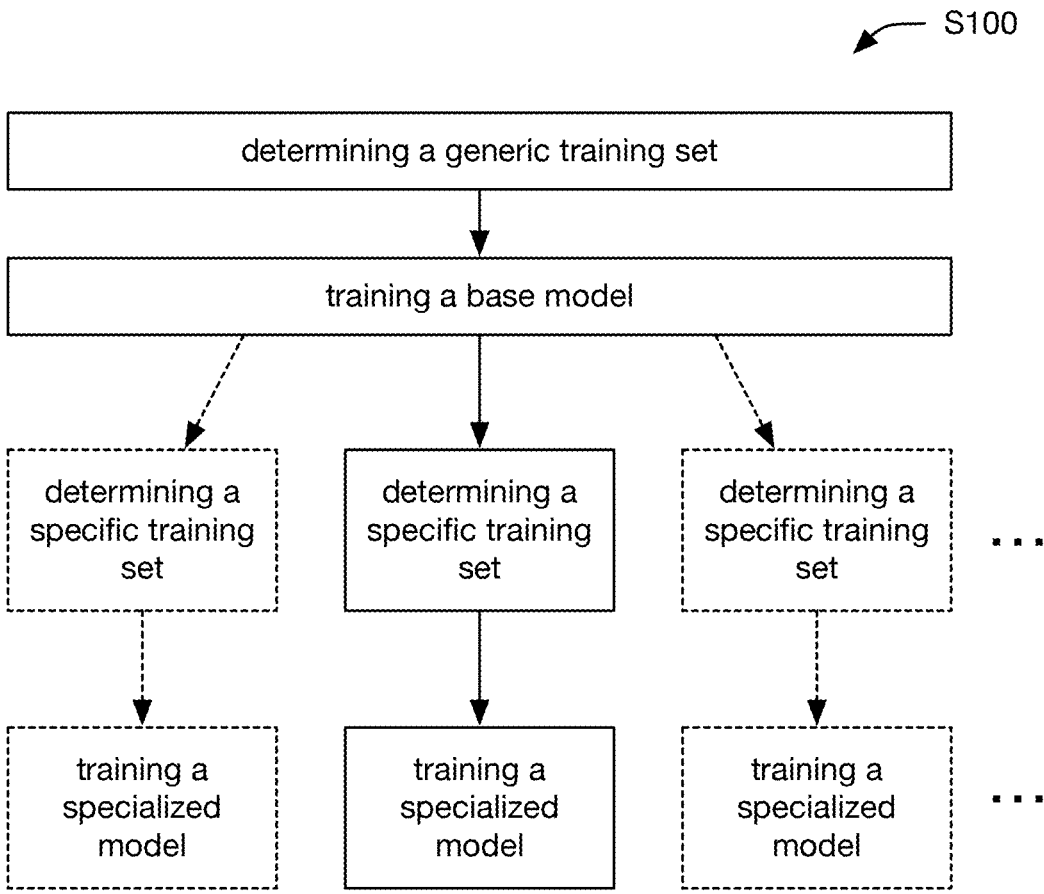
FIG. 3B is a schematic representation of an example of the variation depicted in FIG. 3A.

In some examples, fine tuning a model can include re-tuning (some or all) existing model weights. Additionally or alternatively, fine tuning a model can include determining (e.g., training) one or more output models to append to the existing model (e.g., generating and/or tuning new layers of a neural network that accept the output of the original model as their input and provide a new output; determining a parametric model, such as a linear regression, power-law regression, polynomial regression, or exponential regression model, to accept the output of the original model as input and map it to a new output, such as mapping a value provided by the original model to a new output value; etc.). However, the fine tuning can additionally or alternatively be performed in any other suitable manner. Note that the same base model may be used to generate different specific models (e.g., IC technology- and/or synthesis tool-specific) by performing fine tuning using different specific data to generate the different specialized models (e.g., as shown in FIGS. 3A-3B).

In some embodiments, S100 can include (e.g., as part of fine tuning, after determining the primary model(s)) determining one or more output models that can function to account for differences between simple (e.g., synthetic) training data (e.g., used during training of the primary model) and more complex (e.g., "real-world") IC specifications (e.g., for which predictions of one or more metrics, such as static and/or dynamic power, area, timing arcs, number of gates, number of conductors, etc., are desired). In some such embodiments, these differences can manifest as and/or be adequately modeled by a set of one or more scaling factors (e.g., wherein the output model is a scaling model that applies the one or more scaling factors to the output of the primary model). In such embodiments, the output model(s) are preferably parametric models (e.g., statistical regression models that fit data to one or more predefined functional forms, such as linear, power-law, polynomial, exponential, etc.; in some examples, determining the model can include determining, for each input-output pair mapped by the model, the appropriate functional form to use, such as predetermining based on the type of data, dynamically determining based on which functional form provides the best fit, etc.), but can additionally or alternatively include non-parametric models (e.g., kernel regression, spline regression, local regression, machine learning models such as neural networks and/or random forests, etc.) and/or any other suitable models. For example, S100 can include: training a primary model (e.g., machine learning model such as one or more neural networks, random forests, etc.; parametric model such as a regression model of a specific functional form; hybrid model such as described above in more detail; etc.) using training data that includes simple inputs (e.g., includes only simple inputs, includes mostly simple inputs such as wherein adequate parameter space coverage is achieve via use of the simple inputs, includes substantial amounts of both simple inputs and complex inputs, etc.), such as training data (e.g., synthetic training data) in which each training input includes only one (or only a small number of) operators; and training a scaling model (e.g., parametric model, such as a model that maps input values to output values based on a functional relationship determined for the information represented by the input values in question) based on training data associated with complex inputs for the primary model (e.g., associated only with complex inputs, associated mostly with complex inputs, includes substantial amounts of data associated with both simple inputs and complex inputs, etc.), such as "real-world" data associated with real and/or realistic IC specifications (e.g., wherein the training data for this model would include, for each such complex input, both the output from the primary model and the true values for each output value provided by the primary model. In examples, for each output parameter (e.g., power, area, number of gates, number of conductors, etc.) of the primary model (or for each of any suitable subset of such output parameters), such scaling models can account for any or all of: constant (e.g., $0^{th}$ order) effects (e.g., multiplying the primary model output value by a constant scaling factor), effects associated with overall specification size (e.g., wherein a scaling factor is determined based on the overall number of operators, wherein a single scaling factor is applied to results associated with operators of all kinds, etc.), effects associated with specific operator types (e.g., determining and/or providing separate scaling factors for each type of operator, such as add operators, multiply operators, etc., such as wherein the contributions of each such operator type to a given output parameter are scaled separately and then typically summed with the scaled contributions of the other operator types; determining a scaling factor based on multiple input parameters, such as wherein the number of each type of operator is represented by a different input parameter to the scaling model; etc.), effects with combinations of operators (e.g., accounting for typical combinations of different operator types, such as combinations of add operators with multiply operators, which may typically be located nearby to define elements such as MAC units), and/or any other suitable effects.

In some such embodiments (e.g., in which a primary model is trained using simple inputs, such as trained using exclusively or almost exclusively simple inputs, which can include inputs corresponding to IC specifications that each include only a single operator), S100 preferably includes (e.g., after determining the primary model) determining one or more scaling models (e.g., parametric regression models, such as adaptive/data-driven parametric regression models) that correct (e.g., scale) the predictions of the primary model to account for differences between the simple inputs on which the primary model is trained versus complex (e.g., "real world") IC specifications. The scaling model preferably functions to determine one or more scaling factors (e.g., for all operators, separately for each operator type, etc.) for each output parameter of the primary model (or for any suitable subset of the primary model output parameters). In examples, the scaling model input parameters can include: total operator count, counts for each operator type or any suitable subset thereof, information associated with other input parameters to the primary model (e.g., operator width), information indicative of interactions between operators (e.g., operators of different types, such as add and multiply operators defining a MAC unit), and/or any other suitable information; further, the scaling model inputs can optionally include the primary model outputs and/or information indicative thereof (e.g., wherein the scaling model scales these outputs directly, rather than generating scaling factors to be applied to the outputs).

The scaling model for a particular output parameter is preferably determined based on a training dataset including a plurality of training points, wherein each such training point is associated with a particular IC specification (e.g., wherein each such training point is associated with a particular IC specification and includes information indicative of: output parameter value(s) received from the primary model in association with the particular IC specification; a corresponding true or best-guess value for each such output parameter, such as determined based on performing synthesis for the particular IC specification; and any suitable information regarding the particular IC specification, such as overall operator count, counts for different types of operators, etc.). Determining the scaling models can include determining a separate parametric regression model to correct each specific output parameter (alternatively, a single scaling model can correct multiple output parameters together, such as wherein the correction for a first output parameter depends also on the value(s) of one or more additional output parameters). For example, determining the scaling models can include, based on the training dataset, for each output parameter of the primary model, selecting a parametric form for the model and/or estimating fitting parameter values. Selecting a parametric form can include evaluating (e.g., based on fit criteria, validation metrics, etc.) candidate parametric forms (e.g., linear, power-law, exponential, polynomial, etc.), such as estimating fitting parameter values for each candidate form (or any suitable subset of such forms) and selecting the form that allows for the best fit; additionally or alternatively, selecting a parametric form can be performed based on predetermined selections (e.g., in a particular situation in which one parametric form is known to correspond best to the true behavior, selecting that parametric form) and/or any other suitable information. Estimating fitting parameter values preferably includes determining values that allow the model to best fit the provided training data (but can additionally or alternatively include determining the values in any other suitable manner).

In a first such embodiment, a primary model (or multiple primary models) determines predictions corresponding to only a single operator (e.g., wherein the primary model may be referred to as an operator model), such as wherein the primary model accepts inputs corresponding to only the single operator. In this embodiment, the primary model preferably includes an interpolation model and/or an extrapolation model (e.g., includes a hybrid model such as described above in more detail), but can additionally or alternatively include any other suitable model(s). For example, the scaling model determines one or more scaling factors for the output parameters of the primary model (e.g., based on a total operator count, count for each operator type or any suitable subset of operator types, etc.). In a first example, the method can include applying these scaling factors to the primary model outputs (e.g., as describe below in more detail regarding S325). In a second example, the primary model can be configured to accept one or more such scaling factors (e.g., all the scaling factors, only the scaling factor(s) relevant to a current primary model input, etc.) as additional input parameter(s), wherein the primary model uses the relevant scaling factor(s) to scale its predicted values before outputting them. However, the scaling model can additionally or alternatively be configured in any other suitable manner, and/or the scaling model outputs can additionally or alternatively be used in any other suitable manner.

In a first variant, the primary model is a generic model (e.g., not specific to a particular IC technology and/or synthesis tool; trained using training data specific to a particular IC technology and/or synthesis tool, such as trained using training data associated with free and/or open-source resources, but generalizable to other technologies; etc.). In a first example of this variant, the scaling model also accounts for differences between the primary model and the relevant IC technology and/or synthesis tool. In a second example of this variant, S100 also includes determining a separate specialization model operable to transform the generic predictions of the primary model into technology/synthesis-specific predictions, preferably wherein the specialization model is configured to transform the outputs of the primary model and the scaling model is configured to scale the outputs of the specialization model (but alternatively wherein the scaling model is a generic model configured to scale the outputs of the primary model and the specialization model is configured to transform the outputs of the generic scaling model, and/or wherein the scaling model and specialization model are operable to interact in any other suitable manner).

In a second variant, the primary model is a specialized model trained to provide predictions for a particular IC technology and/or synthesis tool. In this variant, the primary model can be trained using training data specific to a particular IC technology and/or synthesis tool (e.g., wherein synthetic inputs are generated and run through the particular synthesis tool based on the specific IC technology node to determine the corresponding outputs to generate the training data), can be trained using generic training data and/or training data specific to a different technology/synthesis tool but then fine-tuned using training data specific to the desired technology/synthesis tool, and/or can be trained in any other suitable manner.

In some embodiments, S100 can include determining multiple models (e.g., which can be used independently of each other, which can be used in parallel with each other, wherein one such model can be used based on the results of another such model, etc.). For example, S100 can include determining a first model (or set of models, such as described above regarding a primary model chained with a scaling model) that generates predictions regarding one or more "static" characteristics of an IC specification (e.g., static power, area, timing arcs, number of gates, number of conductors, etc.), and can include determining one or more additional models (e.g., that operate independently from the first model, that rely on outputs of the first model, that rely on intermediary representations within the first model such as activations within hidden layers of the first model, etc.) that generate predictions regarding one or more "dynamic" characteristics of the IC specification, such as dynamic power characteristics under particular usage patterns (e.g., based on particular input waveforms to the IC; on particular activity factors, such as factors representative of the rate/probability of signal switching which can include a number of instances (or expected number of instances, such as probabilistic expectation value) of charging and/or discharging a conductor within a given time period, at each conductor of the IC specification or at any suitable subset thereof; etc.). Accordingly, the first model can be used (e.g., only once for a given IC specification) to generate static characteristic predictions, which will typically be constant for a given IC specification (assuming use of a particular technology node, synthesis tool, etc.), whereas the additional model(s) may be used multiple times to generate dynamic characteristic predictions for a variety of different conditions (e.g., wherein characterization of dynamic characteristics is desired for a plurality of sets of input waveforms, the additional model can be used for each such set of input waveforms).

However, the model can additionally or alternatively be determined in any other suitable manner.

3.2 Determining an Input.

Determining an input S200 preferably functions to determine a design for which predictions can be generated. S200 preferably includes receiving the design (and/or a subset thereof), but can additionally or alternatively include determining the design in any other suitable manner.

In some examples, the design is suitable to be provided (e.g., in S300) as an input to a prediction model (e.g., the model generated such as described above regarding S100). For example, the input can be analogous to the inputs described above regarding the training set inputs, such as including a design specification (optionally with a prediction scope, which can function to specify which portions of the design to make predictions for) and timing constraints, optionally along with one or more black box element specifications and/or any other suitable information.

In other examples, the design can include information indicative of a plurality of separate inputs to the prediction model. For example, the design can include a plurality of operators, whereas a model (e.g., primary model) may accept information regarding only one operator at a time, and/or a model (e.g., scaling model) may accept information indicative of operator counts rather than complete operator specifications. In such examples, the method can include pre-processing the information to place it in condition for use with the model(s).

In some embodiments (e.g., in which a model is configured to provide dynamic characteristic predictions), S200 can include directly providing the inputs expected by the model (e.g., activity factor information). Additionally or alternatively, S200 can include providing information that can be used to determine some or all of the inputs expected by the model. For example, the model may expect its inputs to include activity factor information, but S200 can instead include providing a set of input waveforms, a set of instructions to be executed at the IC, and/or any other suitable information indicative of the dynamic state of the IC (e.g., wherein S310 can include determining the activity factor information based on the provided input waveforms and/or other provided information, such as described below in more detail).

However, the method can additionally or alternatively include determining (e.g., receiving) any suitable input in any suitable manner and/or providing that input to the model in any suitable manner.

3.3 Providing Predictions.

Providing predictions S300 preferably functions to predict metrics associated with the input design.

Providing predictions S300 is preferably performed in response to determining the input, and is preferably performed after determining the model.

However, the method can additionally or alternatively include providing predictions with any other suitable timing.

Figure 2B:
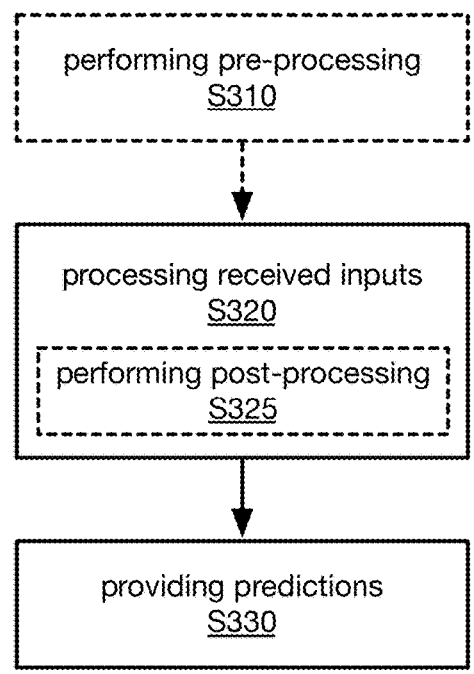
FIG. 2B is a schematic representation of an embodiment of providing predictions according to the method.

Providing predictions S300 preferably includes processing the received input(s) S320 using the model and providing model outputs S330 (and/or derivatives thereof, such as metrics determined based thereon) as predictions; further, S300 can optionally include performing pre-processing S310 (e.g., as shown in FIGS. 2B and/or 4). For example, providing predictions can include, for each operator in the input design, providing one or more of the corresponding metrics output by the model (e.g., power such as static and/or dynamic power, area, timing arcs, number of gates, number of wires, etc.).

3.3.1 Performing Pre-Processing.

Performing pre-processing S310 can function to transform information determined in S200 (e.g., information not in the form expected by the model) into a form that can be accepted by the model. S310 is preferably performed in response to performance of S200 (e.g., in response to determination of information in a form other than that expected by the model), but can additionally or alternatively be performed with any other suitable timing.

In some embodiments (e.g., in which the primary model accepts inputs indicative of properties of only a single operator), S310 can include separating the information determined in S200 (e.g., IC design specification) into a plurality of inputs for the model(s) (e.g., primary model and/or scaling model). For example, S310 can include (based on the IC design specification, other information determined in S200, and/or any other suitable information): for each operator, generating a separate set of input values (e.g., to be provided to the primary model for modelling of the properties of that operator); and/or determining input values for the scaling model (e.g., determining a total operator count, a count for each operator type, etc.). In examples in which multiple instances of a particular operator appear in the IC specification, S310 can optionally include generating only a single set of input values for this operator (e.g., along with an indication of how many instances of the operator appear in the IC specification); however, if dynamic predictions such as dynamic power predictions are to be generated by the model, then a separate set of input values will typically be needed for each instance of the operator, as the activity factor information will typically differ between the instances.

Additionally or alternatively, in some embodiments, S310 can include determining information associated with dynamic power predictions, such as determining activity factor information based on the information determined in S200 (e.g., sets of input waveforms, a set of instructions to be executed at the IC, and/or any other suitable information indicative of the dynamic state of the IC; IC specification; etc.); in such embodiments, S310 is preferably performed for each condition specified in S200 (e.g., performed for each set of input waveforms), such as wherein S310 is performed in response to receipt of information indicative of and/or associated with each such condition, but can additionally or alternatively be performed with any other suitable timing and/or can be repeated any suitable number of times. For example, S310 can include, based on an IC specification and a set of input waveforms (e.g., provided in S200), modeling electrical signals within the specified IC to determine one or more activity factors (e.g., indicative of how often conductors within the IC switch between high and low states), such as determining an activity factor for each input conductor of each operator of the IC.

However, the result of this modeling can include a very large number of parameters (e.g., a separate activity factor for each input conductor of each operator of the IC). Accordingly, in some embodiments, it may be preferable to reduce the dimensionality of the input space (e.g., which can result in superior model performance, more compact models, more efficient model training and/or inference, etc.), such as by employing parameter aggregation, preferably across functionally-related parameters. For example, the input conductors can be partitioned based on functional groupings (e.g., wherein the input conductors of the same operator are grouped together, such as wherein each operator defines a separate grouping, wherein multiple groupings are allocated to a single operator, etc.), and then one or more aggregated parameters can be determined for each such group (e.g., one or more descriptive statistics for the activity factors of the input conductors of the group). In examples, the aggregated parameters can include one or more measures of central tendency (e.g., arithmetic mean, geometric mean, harmonic mean, median, mode, trimmed mean, midrange, Winsorized mean, Hodges-Lehmann estimator, etc.), measures of dispersion and/or variability (e.g., range, range between two percentiles such as an interquartile range, variance, standard deviation, coefficient of variation, mean absolute deviation, median absolute deviation, etc.), measures of shape and/or distribution (e.g., skewness, kurtosis, modality, entropy, uniformity, etc.), measures of position and/or percentiles (e.g., quantiles, z-scores, percentile rank, cumulative percentages, etc.), measures of relationship (e.g., correlation coefficients, covariance, regression coefficients, odds ratio, relative risk, etc.), measures of concentration (e.g., Gini coefficient, Herfindahl-Hirschman Index, concentration ratio, Lorenz curve metrics, Theil index, etc.), and/or robust statistics (e.g., M-estimators such as Huber's M-estimator, median absolute deviation, Winsorized mean, trimmed mean, Hodges-Lehmann estimator, etc.). For example, the activity factors of the conductors of each functional grouping could be aggregated into a single measure of central tendency (e.g., mean), optionally along with a measure of dispersion (e.g., variance) and/or any other suitable descriptive statistical measures.

In one example, for each operator, the input conductors of that operator are either grouped together as a single group or partitioned into multiple groups (e.g., a first group for all conductors corresponding to a first input value and a second group for all conductors corresponding to a second input value; a first group for all conductors corresponding to a least significant bit, a second group for all conductors corresponding to a second least significant bit, etc.; a separate group for all conductors within each bit or word; etc.), and for each such group, the activity factors are aggregated into a single measure of central tendency (e.g., geometric mean, arithmetic mean, etc.). Accordingly, the dimensionality of the input space (e.g., for dynamic power modeling/prediction) can be significantly reduced (e.g., down to the number of operators in the IC specification, down to a small multiple of the number of operators in the IC specification, etc.).

However, the dimensionality of the input space can alternatively be kept high (e.g., wherein no parameter aggregation or other dimensionality reduction is performed, wherein only minimal dimensionality reduction is performed, etc.). Further, S300 can alternatively omit performing S310 (e.g., wherein all information determined in S200 is in a form appropriate for input to the model).

3.3.2 Processing Received Inputs.

Processing the received input(s) S320 is preferably performed using one or more models (e.g., the model(s) generated in S100). S320 is preferably performed in response to determining the input S200 (e.g., wherein all information determined in S200 is in a form appropriate for input to the model) and/or performing pre-processing S310 (e.g., wherein some or all information determined in S200 must be pre-processed before being provided as input to the model). S320 can be performed for each IC specification determined in S200, for each set of dynamic condition information determined in S200 and/or S310, and/or for each set of input values determined in S310.

In some embodiments, S320 can include performing post-processing S325.

In some such embodiments (e.g., in which the model includes a primary model and a scaling model), S325 can include modifying outputs of the model (e.g., using the scaling model to scale outputs of the primary model). For example, S320 can include: providing the input information (e.g., determined in S200 and/or S310) to a primary model, receiving output values from the primary model, and providing those outputs (e.g., along with some or all of the input information) to a scaling model, preferably wherein the outputs of the scaling model are relied upon as the outputs of the model (e.g., wherein S330 includes providing the outputs of the scaling model, such as rather than providing the outputs of the primary model).

Additionally or alternatively, S325 can include aggregating output information. In some such embodiments, S325 can include aggregating output information associated with subsets of the IC specification, such as associated with individual operators, into summary information. In some examples, aggregating output information can include determining total static and/or dynamic power, total area, total conductor count, total transistor count, and/or totals of any other suitable output parameters. Additionally or alternatively, aggregating output information can include determining indications of performance-limiting operators, such as identifying the longest timing arcs and/or identifying all timing arcs that exceed a threshold maximum (e.g., threshold maximum associated with a desired clock speed). However, S325 can additionally or alternatively include aggregating output information in any other suitable manner, and/or can include performing any other suitable post-processing.

In a first example, S320 can include, once all input information (e.g., both static and dynamic information) has been determined, providing the input information to the model to predict outputs. In a second example, S320 can include, in response to receiving an IC specification determined in S200, predicting static characteristics, and in response to receiving dynamic condition information determined in S200 and/or S310, predicting dynamic characteristics. In a third example, S320 can include only using static information, such as wherein S320 is performed (e.g., by providing the static information as an input to the model) in response to determining the static information in S200.

In some embodiments, in which S310 includes determining a plurality of sets of input values for the model(s) (e.g., by separating the information determined in S200 into separate sets of input values, such as wherein each such set is indicative of a single operator), S320 can include providing each such set of inputs separately to the model. For example, S320 can include: for each such set (e.g., wherein each set corresponds to a single operator), using the model (e.g., primary model) to determine predicted metrics for associated elements (e.g., the associated operator); optionally using the scaling model to determine one or more scaling factors; and/or performing post-processing S325 (e.g., to apply the scaling factors to the primary model outputs, to aggregate the output values corresponding to the different sets of inputs, etc.). In a variation, S320 includes: using the scaling model to determine one or more scaling factors, providing each set of input values to the primary model along with one or more scaling factors (e.g., all scaling factors determined by the scaling model, only scaling factors relevant to the current set of input values, etc.) wherein the primary model uses the scaling factor(s) to scale its outputs, and/or aggregating the output values of the primary model (e.g., as describe above regarding S325).

However, S320 can additionally or alternatively be performed with any other suitable timing, and/or can additionally or alternatively include processing the received inputs in any other suitable manner.

3.3.3 Providing Model Outputs.

Providing model outputs S330 preferably functions to provide the outputs determined in S320. Providing model outputs S330 is preferably performed after (e.g., in response to) processing the received inputs S320. However, the method can additionally or alternatively include providing model outputs S330 with any other suitable timing.

In examples, S330 can include: storing output values (e.g., in one or more computer-readable media, such as non-transitory computer-readable media), making output values available (e.g., via an API), providing output values (e.g., transmitting the output values to another entity, displaying output values and/or causing output values to be displayed, etc.), determining derivative values based on the output values (e.g., wherein some or all such derivative values may be provided in a manner analogous to that described above regarding providing model outputs), and/or determining whether model outputs exceed a threshold (e.g., wherein such determinations may be provided in a manner analogous to that described above regarding providing model outputs). However, the model outputs can additionally or alternatively be provided to any suitable entities in any other suitable manner.

However, S330 can additionally or alternatively include providing the model outputs in any other suitable manner, and/or S300 can additionally or alternatively include providing predictions in any other suitable manner.

3.4 Repetition.

The method 20 can optionally include repetition of determining an input S200 and/or providing predictions S300 for any suitable number of repetitions (e.g., using the same model generated as described above). Additionally or alternatively, the method can include determining additional models (e.g., including performing different fine tuning operations for the same base model, determining different scaling models, and/or determining different base models, etc.), wherein the received inputs can be provided to an appropriate model corresponding to the desired IC technology and/or synthesis tool (e.g., providing a single received input to multiple such specialized models, providing different inputs to different models, etc.).

However, the method for integrated circuit design can additionally or alternatively include any other suitable elements performed in any suitable manner.

4. System

The system for IC design preferably includes a training module 11, an input module 12, a prediction module 13, one or more models 14 (e.g., trained models), and/or one or more computing systems 15 (e.g., implementing the one or more models and/or modules), such as shown by way of example in FIG. 5.

The one or more models 14 preferably include one or more models such as described above regarding the method (e.g., regarding determining a model S100 and/or providing predictions S300). For example, the models preferably include one or more primary models (e.g., generic models, specialized models, etc.), and can optionally include one or more scaling models, models configured to predict information associated with dynamic IC conditions, and/or any other suitable model(s). The models are preferably implemented by and/or accessible for use by the one or more computing systems.

The training module 11 preferably functions to train the one or more models. For example, the training module can perform (and/or be configured to perform) S100 (or any suitable subset thereof), such as described above in more detail regarding the method. The training module can optionally receive information (e.g., training data and/or subsets thereof) from the input module, but can additionally or alternatively receive information from any other suitable elements of the system and/or from any suitable entities, and/or can have any other suitable functionality.

The input module 12 preferably functions to provide input information for the one or more models. For example, the input module can perform (and/or be configured to perform) S200 (or any suitable subset thereof), such as described above in more detail regarding the method. The input module can optionally receive information (e.g., the input information or any suitable subset thereof, information that can be used to generate the input information, etc.) from one or more users, other elements of the computing system, other computing systems, and/or any other suitable entities. The input module preferably provides the input information to the prediction module, and can optionally provide input information (e.g., with or without training labels) to the training module (e.g., for use as or as part of a training dataset). However, the input module can additionally or alternatively provide input information to any other suitable elements of the system and/or to any suitable entities, and/or can have any other suitable functionality.

The prediction module 13 preferably functions to make predictions using the one or more models. For example, the prediction module can perform (and/or be configured to perform) S300 (or any suitable subset thereof), such as described above in more detail regarding the method. The prediction module preferably receives input information (e.g., from the input module). The prediction module can optionally perform any suitable processing of the received information (e.g., pre-processing, such as described above in more detail regarding S310). The prediction module preferably provides inputs (e.g., the received input information, the pre-processed information, etc.) to the one or more models, and preferably receives output information from the models that it employs. For example, the prediction module can provide input information to the primary model, then provide (and/or control another element, such as the primary model or any other suitable element of the computing system(s), to provide) the output of the primary model to a scaling model, and then receive the output from the scaling model. The prediction module preferably provides the predicted values (e.g., as described above in more detail regarding S330). However, the prediction module can additionally or alternatively determine predictions in any other suitable manner, and/or have any other suitable functionality.

All or portions of the system can be hosted, run, executed, or otherwise managed by one or more computing systems, such as remote computing systems (e.g., cloud platform, etc.), local computing systems, and/or any other suitable computing systems. All or portions of the system can be managed by an entity separate from the users, but can alternatively be managed by the users themselves.

The models can use classical or traditional approaches, machine learning approaches, and/or other approaches. The models can include regression (e.g., linear regression, non-linear regression, logistic regression, etc.), decision tree, LSA, clustering, association rules, dimensionality reduction (e.g., PCA, t-SNE, LDA, etc.), neural networks (e.g., CNN, DNN, CAN, LSTM, RNN, encoders, decoders, deep learning models, transformers, etc.), ensemble methods, optimization methods, classification, rules, heuristics, equations (e.g., weighted equations, etc.), selection (e.g., from a library), regularization methods (e.g., ridge regression), Bayesian methods (e.g., Naïve Bayes, Markov, etc.), instance-based methods (e.g., nearest neighbor), kernel methods, support vectors (e.g., SVM, SVC, etc.), statistical methods (e.g., probability), comparison methods (e.g., matching, distance metrics, thresholds, etc.), deterministics, genetic programs, and/or any other suitable architecture. The models can include (e.g., be constructed using) a set of input layers, output layers, and hidden layers (e.g., connected in series, such as in a feed forward network; connected with a feedback loop between the output and the input, such as in a recurrent neural network; etc.; wherein the layer weights and/or connections can be learned through training); a set of connected convolution layers (e.g., in a CNN); a set of self-attention layers; and/or have any other suitable architecture. The models can include less than 10, tens, hundreds, thousands, tens of thousands, hundreds of thousands, and/or any other number of parameters (e.g., weights, biases, etc.). The models can extract data features (e.g., feature values, feature vectors, high-dimensional features, embeddings in a high-dimensional space with hundreds or thousands of dimensions, human-unintelligible features, etc.) from the input data, and determine the output based on the extracted features. However, the models can otherwise determine the output based on the input data.

Models can be trained, learned, fit, predetermined, and/or can be otherwise determined. The models can be trained or learned using: supervised learning, unsupervised learning, self-supervised learning, semi-supervised learning (e.g., positive-unlabeled learning), reinforcement learning, transfer learning, Bayesian optimization, fitting, interpolation and/or approximation (e.g., using gaussian processes), backpropagation, and/or otherwise generated. The models can be learned or trained on: labeled data (e.g., data labeled with the target label), unlabeled data, positive training sets (e.g., a set of data with true positive labels, negative training sets (e.g., a set of data with true negative labels), and/or any other suitable set of data.

Any model can optionally be validated, verified, reinforced, calibrated, or otherwise updated based on newly received, up-to-date measurements; past measurements recorded during the operating session; historic measurements recorded during past operating sessions; or be updated based on any other suitable data.

Any model can optionally be run or updated: once; at a predetermined frequency; every time the method is performed; every time an unanticipated measurement value is received; or at any other suitable frequency. Any model can optionally be run or updated: in response to determination of an actual result differing from an expected result; or at any other suitable frequency. Any model can optionally be run or updated concurrently with one or more other models, serially, at varying frequencies, or at any other suitable time.

5. Exemplary Embodiments

A first exemplary embodiment of the method is described below. In this exemplary embodiment, the method preferably includes: determining (e.g., fitting) a primary model (e.g., hybrid model such as described above regarding S100) that accepts inputs indicative of parameters of a single operator within an IC design specification; determining (e.g., fitting) a scaling model to determine scaling factors for the outputs of the primary model; determining one or more inputs (e.g., IC design specifications), such as described above in more detail regarding S200; for each input determined in S200, performing pre-processing to separate the input into sets of input values (each corresponding to a single operator) for the primary model and to determine input values for the scaling model; providing the scaling model input values to the scaling model to determine one or more scaling factors; for each set of primary model input values, providing the input values to the primary model to determine a set of predicted metrics (e.g., power, area, conductor count, transistor count, timing arcs); based on the scaling factors, adjusting the predicted metrics; optionally aggregating the adjusted metrics into aggregate metrics (e.g., as described above in more detail regarding S325); and/or optionally providing one or more metrics (e.g., adjusted metrics, aggregate metrics, etc.), such as providing the metrics to a user and/or via an API.

The primary model is preferably a specialized model (e.g., trained specifically for a particular IC technology and/or synthesis tool). The primary model is preferably trained based on a synthetic training dataset. The training dataset preferably has dense coverage over the input parameter value space (e.g., coverage based on powers of two, such as described above in more detail regarding S100).

A numbered list of specific examples of the technology described herein are provided below. A person of skill in the art will recognize that the scope of the technology is not limited to and/or by these specific examples.

1. A method for integrated circuit design, the method comprising:
   determining an operator-level training set, the operator-level training set comprising a plurality of operator-level examples, wherein each operator-level example of the plurality comprises:
      a respective set of operator specification information descriptive of characteristics of a respective integrated circuit (IC) operator specification; and
      a respective set of IC metrics descriptive of characteristics of a respective operator netlist, the respective operator netlist synthesized from the respective IC operator specification using a synthesis tool;
   based on the operator-level training set, generating an operator model configured to estimate IC metrics based on operator specification information, the IC metrics comprising at least one of: a power metric, a timing metric, an area metric, a gate count metric, or a conductor count metric, wherein the operator model is a first statistical model;
   determining an IC-level training set, the IC-level training set comprising a plurality of IC-level examples, wherein:
      each IC-level example of the plurality is associated with a respective IC design specification and a respective IC netlist, the respective IC netlist synthesized from the respective IC design specification using the synthesis tool;
      each IC-level example of the plurality comprises a respective plurality of extracted operator-level examples;
      for each IC-level example of the plurality, each extracted operator-level example of the respective plurality comprises:
         a respective set of operator specification information descriptive of characteristics of a respective operator of the respective IC design specification;
         a respective set of estimated IC metrics for the respective operator, the respective set of estimated IC metrics determined by providing the respective set of operator specification information to the operator model; and a respective set of IC metrics descriptive of the respective operator, the respective set of IC metrics determined based on the respective IC netlist;

based on the IC-level training set, generating a scaling model configured to estimate scaling factors based on IC design specifications, wherein the scaling model is a second statistical model;

receiving an IC design specification;

based on the IC design specification, determining:
a set of operator counts; and
a plurality of sets of operator specification information, each set of the plurality descriptive of characteristics of a respective operator of the IC design specification;

at the scaling model, based on the set of operator counts, determining a set of scaling factors; and for each set of operator specification information of the plurality:
at the operator model, based on the set of operator specification information, determining a respective set of unscaled IC metrics;
based on the respective set of unscaled IC metrics and the set of scaling factors, determining a respective set of scaled IC metrics, comprising, for each unscaled IC metric of the respective set:
selective a respective scaling factor from the set of scaling factors; and
computing a product of the unscaled IC metric and the respective scaling factor; and
providing the respective set of scaled IC metrics to a user.

2. A method for integrated circuit design, the method comprising:
receiving an integrated circuit (IC) design specification comprising a set of operators;
based on the IC design specification, determining a set of operator counts indicative of a cardinality of the set of operators;
for each operator of the set of operators, based on the IC design specification, determining a respective set of operator specification information descriptive of characteristics of the operator;
at a scaling model configured to estimate scaling factors based on IC design specifications, based on the set of operator counts, determining a set of scaling factors;
for each operator of the set of operators:
at an operator model configured to estimate IC metrics based on operator specification information, based on the respective set of operator specification information, determining a respective set of unscaled IC metrics, wherein the operator model is a statistical model;
based on the respective set of unscaled IC metrics and the set of scaling factors, determining a respective set of scaled IC metrics, comprising, for each unscaled IC metric of the respective set:
selective a respective scaling factor from the set of scaling factors; and
computing a product of the unscaled IC metric and the respective scaling factor;
determining IC metric information based on the sets of scaled IC metrics; and
providing the IC metric information to a user.

3. The method of any of the preceding Specific Examples, wherein the IC design specification is a register-transfer level (RTL) specification.

4. The method of any of the preceding Specific Examples, wherein, for each operator of the set of operators, the respective set of unscaled IC metrics comprises at least one of: a power metric, a timing metric, an area metric, a gate count metric, or a conductor count metric.

5. The method of any of the preceding Specific Examples, wherein, for each operator of the set of operators, the respective set of unscaled IC metrics comprises a setup timing metric.

6. The method of any of the preceding Specific Examples, wherein, for each operator of the set of operators:
the respective set of operator specification information comprises activity factor information associated with inputs to the operator under a specific operation condition; and
the respective set of unscaled IC metrics comprises a dynamic power metric for the specific operation condition.

7. The method of Specific Example 6, further comprising:
receiving dynamic operation information indicative of IC input waveforms for the specific operation condition;
based on the IC design specification and the dynamic operation information, simulating waveforms within the IC under the specific operation condition; and
for each operator of the set, determining the respective activity factor information based on the simulated waveforms.

8. The method of Specific Example 7, wherein, for each operator of the set, determining the respective activity factor information comprises:
selecting a respective plurality of input conductors of the operator;
determining a respective plurality of activity factors, comprising, for each input conductor of the respective plurality, determining a respective activity factor of the respective plurality based on the simulated waveforms; and
calculating a respective geometric mean of the respective plurality of activity factors, wherein the respective activity factor information is determined based on the geometric mean.

9. The method of Specific Example 7 or 8, wherein, for each operator of the set of operators:
the respective set of operator specification information further comprises second condition activity factor information associated with inputs to the operator under a second specific operation condition; and
the respective set of unscaled IC metrics comprises a second condition dynamic power metric for the second specific operation condition.

10. The method of Specific Example 9, further comprising:
receiving second condition dynamic operation information indicative of IC input waveforms for the second specific operation condition;
based on the IC design specification and the second condition dynamic operation information, simulating second condition waveforms within the IC under the second specific operation condition; and
for each operator of the set, determining the respective second condition activity factor information based on the simulated second condition waveforms.

11. The method of any of the preceding Specific Examples, wherein:
the operator model is trained based on a plurality of single-operator IC design specifications; and the scaling model is trained based on a plurality of multi-operator IC design specifications.

12. The method of any of the preceding Specific Examples, wherein, for each operator of the set of operators, the respective set of operator specification information is descriptive of a respective operator type and a respective operator input bit width.

13. The method of Specific Example 12, wherein, for a first operator of the set of operators, the respective operator type is multiply.

14. The method of Specific Example 12 or 13, wherein the set of operator counts comprises, for each operator type of the IC design specification, a respective operator count, wherein the sum of operator counts for each operator type is equal to the cardinality of the set of operators.

15. The method of Specific Example 14, wherein:
the set of scaling factors comprises, for each operator type, a respective scaling factor; and
for each operator of the set of operators, selecting the respective scaling factor comprises:
determining a respective operator type for the operator; and
selecting the respective scaling factor for the respective operator type.

16. The method of any of the preceding Specific Examples, wherein the operator model comprises:
an interpolation sub-model configured to interpolate between examples of an operator model training set; and
an extrapolation sub-model configured to extrapolate out from the operator model training set.

17. The method of Specific Example 16, wherein the interpolation sub-model is a data-driven model.

18. The method of Specific Example 17, wherein the data-driven model comprises a linear interpolation mesh.

19. The method of any of Specific Examples 16-18, wherein the extrapolation sub-model is a parametric regression model.

20. The method of Specific Example 19, further comprising, based on an operator model training set, determining a functional form for the parametric regression model.

21. The method of any of the preceding Specific Examples, wherein the scaling model is a parametric regression model.

22. The method of any of the preceding Specific Examples, further comprising acting based on the IC metric information.

23. The method of Specific Example 22, wherein acting based on the IC metric information comprises modifying the IC design specification based on the IC metric information.

24. The method of Specific Example 23, wherein acting based on the IC metric information further comprises, after modifying the IC design specification, repeating any or all elements of any of Specific Examples 2-20 using the modified IC design specification.

25. The method of Specific Example 23 or 24, wherein acting based on the IC metric information further comprises fabricating an IC based on the modified IC design specification.

26. The method of Specific Example 22, wherein acting based on the IC metric information comprises fabricating an IC based on the IC design specification.

27. A method for integrated circuit design, the method comprising:

determining an operator-level training set, the operator-level training set comprising a plurality of operator-level examples, wherein each operator-level example of the plurality comprises:
a respective set of operator specification information descriptive of characteristics of a respective integrated circuit (IC) operator specification; and
a respective set of IC metrics descriptive of characteristics of a respective operator netlist, the respective operator netlist synthesized from the respective IC operator specification using a first synthesis tool;
based on the operator-level training set, generating an operator model configured to estimate a set of IC metrics based on a set of operator specification information, wherein the operator model is a first statistical model;
determining an IC-level training set, the IC-level training set comprising a plurality of IC-level examples, wherein:
each IC-level example of the plurality is associated with a respective IC design specification and a respective IC netlist, the respective IC netlist synthesized from the respective IC design specification using a second synthesis tool;
each IC-level example of the plurality comprises a respective plurality of extracted operator-level examples;
for each IC-level example of the plurality, each extracted operator-level example of the respective plurality comprises:
a respective set of operator specification information descriptive of characteristics of a respective operator of the respective IC design specification;
a respective set of estimated IC metrics for the respective operator, the respective set of estimated IC metrics determined by providing the respective set of operator specification information to the operator model; and
a respective set of IC metrics descriptive of the respective operator, the respective set of IC metrics determined based on the respective IC netlist; and
based on the IC-level training set, generating a scaling model configured to estimate scaling factors based on IC design specifications, wherein the scaling model is a second statistical model.

28. The method of Specific Example 27, further comprising one or more elements such as described regarding any one or more of Specific Examples 1-26.

29. A system configured to perform the method of any of Specific Examples 1-28.

30. The system of Specific Example 29, comprising an input module and a prediction module.

31. The system of Specific Example 29 or 30, comprising a training module.

32. The system of Specific Example 30 or 31, wherein the input module and the prediction module are implemented on a set of one or more computing systems.

However, the method can additionally or alternatively be performed in any other suitable manner.

All references cited herein are incorporated by reference in their entirety, except to the extent that the incorporated material is inconsistent with the express disclosure herein, in which case the language in this disclosure controls.

As used herein, "substantially" or other words of approximation can be within a predetermined error threshold or tolerance of a metric, component, or other reference, and/or be otherwise interpreted.

Optional elements, which can be included in some variants but not others, are indicated in broken line in the figures. However, unbroken lines in the figures should not be interpreted to indicate that the depicted elements are essential or may not be omitted from variants of the invention.

Different subsystems and/or modules discussed above can be operated and controlled by the same or different entities. In the latter variants, different subsystems can communicate via: APIs (e.g., using API requests and responses, API keys, etc.), requests, and/or other communication channels. Communications between systems can be encrypted (e.g., using symmetric or asymmetric keys), signed, and/or otherwise authenticated or authorized.

Alternative embodiments implement the above methods and/or processing modules in non-transitory computer-readable media, storing computer-readable instructions that, when executed by a processing system, cause the processing system to perform the method(s) discussed herein. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUs, TPUS, microprocessors, or ASICs, but the instructions can alternatively or additionally be executed by any suitable dedicated hardware device.

Embodiments of the system and/or method can include every combination and permutation of the various system components and the various method processes, wherein one or more instances of the method and/or processes described herein can be performed asynchronously (e.g., sequentially), contemporaneously (e.g., concurrently, in parallel, etc.), or in any other suitable order by and/or using one or more instances of the systems, elements, and/or entities described herein. Components and/or processes of the following system and/or method can be used with, in addition to, in lieu of, or otherwise integrated with all or a portion of the systems and/or methods disclosed in the applications mentioned above, each of which are incorporated in their entirety by this reference.

The FIGURES illustrate the architecture, functionality and operation of possible implementations of systems, methods and computer program products according to preferred embodiments, example configurations, and variations thereof. In this regard, each block in the flowchart or block diagrams may represent a module, segment, step, or portion of code, which comprises one or more executable instructions for implementing the specified logical function(s). It should also be noted that, in some alternative implementations, the functions noted in the block can occur out of the order noted in the FIGURES. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As a person skilled in the art will recognize from the previous detailed description and from the figures and claims, modifications and changes can be made to the preferred embodiments of the invention without departing from the scope of this invention defined in the following claims.

I claim:

1. A method for integrated circuit design, the method comprising:
   determining an operator-level training set, the operator-level training set comprising a plurality of operator-level examples, wherein each operator-level example of the plurality comprises:
      a respective set of operator specification information descriptive of characteristics of a respective integrated circuit (IC) operator specification; and
      a respective set of IC metrics descriptive of characteristics of a respective operator netlist, the respective operator netlist synthesized from the respective IC operator specification using a synthesis tool;
   based on the operator-level training set, generating an operator model configured to estimate IC metrics based on operator specification information, the IC metrics comprising at least one of: a power metric, a timing metric, an area metric, a gate count metric, or a conductor count metric, wherein the operator model is a first statistical model;
   determining an IC-level training set, the IC-level training set comprising a plurality of IC-level examples, wherein:
      each IC-level example of the plurality is associated with a respective IC design specification and a respective IC netlist, the respective IC netlist synthesized from the respective IC design specification using the synthesis tool;
      each IC-level example of the plurality comprises a respective plurality of extracted operator-level examples;
      for each IC-level example of the plurality, each extracted operator-level example of the respective plurality comprises:
         a respective set of operator specification information descriptive of characteristics of a respective operator of the respective IC design specification;
         a respective set of estimated IC metrics for the respective operator, the respective set of estimated IC metrics determined by providing the respective set of operator specification information to the operator model; and
         a respective set of IC metrics descriptive of the respective operator, the respective set of IC metrics determined based on the respective IC netlist;
   based on the IC-level training set, generating a scaling model configured to estimate scaling factors based on IC design specifications, wherein the scaling model is a second statistical model;
   receiving an IC design specification;
   based on the IC design specification, determining:
      a set of operator counts; and
      a plurality of sets of operator specification information, each set of the plurality descriptive of characteristics of a respective operator of the IC design specification;

at the scaling model, based on the set of operator counts, determining a set of scaling factors; and for each set of operator specification information of the plurality:

at the operator model, based on the set of operator specification information, determining a respective set of unscaled IC metrics;

based on the respective set of unscaled IC metrics and the set of scaling factors, determining a respective set of scaled IC metrics, comprising, for each unscaled IC metric of the respective set:

selecting a respective scaling factor from the set of scaling factors; and computing a product of the unscaled IC metric and the respective scaling factor; and providing the respective set of scaled IC metrics to a user.

2. A method for integrated circuit design, the method comprising:

receiving an integrated circuit (IC) design specification comprising a set of operators;

based on the IC design specification, determining a set of operator counts indicative of a cardinality of the set of operators;

for each operator of the set of operators, based on the IC design specification, determining a respective set of operator specification information descriptive of characteristics of the operator;

at a scaling model configured to estimate scaling factors based on IC design specifications, based on the set of operator counts, determining a set of scaling factors;

for each operator of the set of operators:

at an operator model configured to estimate IC metrics based on operator specification information, based on the respective set of operator specification information, determining a respective set of unscaled IC metrics, wherein the operator model is a statistical model;

based on the respective set of unscaled IC metrics and the set of scaling factors, determining a respective set of scaled IC metrics, comprising, for each unscaled IC metric of the respective set:

selecting a respective scaling factor from the set of scaling factors; and computing a product of the unscaled IC metric and the respective scaling factor;

determining IC metric information based on the sets of scaled IC metrics; and providing the IC metric information to a user.

3. The method of claim 2, wherein the IC design specification is a register-transfer level (RTL) specification.

4. The method of claim 2, wherein, for each operator of the set of operators, the respective set of unscaled IC metrics comprises at least one of: a power metric, a timing metric, an area metric, a gate count metric, or a conductor count metric.

5. The method of claim 2, wherein, for each operator of the set of operators, the respective set of unscaled IC metrics comprises a setup timing metric.

6. The method of claim 2, wherein, for each operator of the set of operators:

the respective set of operator specification information comprises activity factor information associated with inputs to the operator under a specific operation condition; and the respective set of unscaled IC metrics comprises a dynamic power metric for the specific operation condition.

7. The method of claim 6, further comprising:

receiving dynamic operation information indicative of IC input waveforms for the specific operation condition;

based on the IC design specification and the dynamic operation information, simulating waveforms within the IC under the specific operation condition; and for each operator of the set, determining the respective activity factor information based on the simulated waveforms.

8. The method of claim 7, wherein, for each operator of the set, determining the respective activity factor information comprises:

selecting a respective plurality of input conductors of the operator;

determining a respective plurality of activity factors, comprising, for each input conductor of the respective plurality, determining a respective activity factor of the respective plurality based on the simulated waveforms; and calculating a respective geometric mean of the respective plurality of activity factors, wherein the respective activity factor information is determined based on the geometric mean.

9. The method of claim 7, wherein:

for each operator of the set of operators:

the respective set of operator specification information further comprises second condition activity factor information associated with inputs to the operator under a second specific operation condition; and the respective set of unscaled IC metrics comprises a second condition dynamic power metric for the second specific operation condition; and the method further comprises:

receiving second condition dynamic operation information indicative of IC input waveforms for the second specific operation condition;

based on the IC design specification and the second condition dynamic operation information, simulating second condition waveforms within the IC under the second specific operation condition; and for each operator of the set, determining the respective second condition activity factor information based on the simulated second condition waveforms.

10. The method of claim 2, wherein:

the operator model is trained based on a plurality of single-operator IC design specifications; and the scaling model is trained based on a plurality of multi-operator IC design specifications.

11. The method of claim 2, wherein, for each operator of the set of operators, the respective set of operator specification information is descriptive of a respective operator type and a respective operator input bit width.

12. The method of claim 11, wherein, for a first operator of the set of operators, the respective operator type is multiply.

13. The method of claim 11, wherein the set of operator counts comprises, for each operator type of the IC design specification, a respective operator count, wherein the sum of operator counts for each operator type is equal to the cardinality of the set of operators.

14. The method of claim 13, wherein:

the set of scaling factors comprises, for each operator type, a respective scaling factor;

for each operator of the set of operators, selecting the respective scaling factor comprises:
    determining a respective operator type for the operator; and
    selecting the respective scaling factor for the respective operator type.

15. The method of claim 2, wherein the operator model comprises:
    an interpolation sub-model configured to interpolate between examples of an operator model training set; and
    an extrapolation sub-model configured to extrapolate out from the operator model training set.

16. The method of claim 15, wherein the interpolation sub-model is a data-driven model.

17. The method of claim 16, wherein the data-driven model comprises a linear interpolation mesh.

18. The method of claim 15, wherein the extrapolation sub-model is a parametric regression model.

19. The method of claim 18, further comprising, based on an operator model training set, determining a functional form for the parametric regression model.

20. The method of claim 2, wherein the scaling model is a parametric regression model.

* * * * *